United States Patent [19]

Takahashi et al.

[11] Patent Number: 4,472,366

[45] Date of Patent: Sep. 18, 1984

[54] METHOD OF PREPARING CRYSTALLINE ALUMINOSILICATE ZEOLITES

[75] Inventors: Hiroshi Takahashi, Tokyo; Hiromi Nakamoto, Yokohama, both of Japan

[73] Assignee: Catalysts & Chemicals Industries Co., Ltd., Tokyo, Japan

[21] Appl. No.: 445,871

[22] Filed: Dec. 1, 1982

[51] Int. Cl.$^3$ ............................................. C01B 33/28
[52] U.S. Cl. ................................... 423/328; 423/329; 423/330; 423/332
[58] Field of Search .................. 423/328, 329; 502/77

[56] References Cited

FOREIGN PATENT DOCUMENTS 57016 8/1982 European Pat. Off. ............ 423/328
6160315 12/1981 Japan ................................... 423/328

*Primary Examiner*—John Doll
*Assistant Examiner*—Jackson Leeds
*Attorney, Agent, or Firm*—Flynn, Thiel, Boutell & Tanis

[57] ABSTRACT

A method of synthesizing a crystalline aluminosilicate zeolite from a reaction mixture containing a base, silica, alumina and water, wherein an alkali metal compound and an amide compound are concurrently used as said base.

8 Claims, No Drawings

METHOD OF PREPARING CRYSTALLINE ALUMINOSILICATE ZEOLITES

BACKGROUND OF THE INVENTION

This invention relates to synthesis of novel crystalline aluminosilicate zeolites. More particularly, this invention relates to a method of synthesizing a crystalline aluminosilicate zeolite from a reaction mixture containing an alkali metal compound, an amide compound, a silicon compound, an aluminum compound and water.

It may be generally said that zeolites are crystals of hydrated aluminosilicates of alkali metals and alkaline earth metals and structurally comprise a three-dimensional network of Si—$O_4$ and Al—$O_4$ in which the tetrahedra are cross-linked by the sharing of oxygen atoms. Such crystalline zeolites have a crystalline structure within which there are channels, cations, molecules of water and mutually interconnected cavities. The molecules of water are normally dehydrated continuously or reversibly and the crystalline structure is not destroyed by said dehydration. Therefore, these crystalline zeolites are formed into porous adsorbents. As the pores of the crystalline zeolites have a uniform diameter of several Å, these crystalline zeolites act as molecular sieves to accept for adsorption only molecules whose molecular diameter is smaller than this pore diameter. Such crystalline zeolites are well known as molecular sieves, and various processes are industrialized taking advantage of these characteristics.

Crystalline aluminosilicate zeolites are basically synthesized by depositing crystals from a four-component system consisting of base, silica, alumina and water. Crystalline aluminosilicate zeolites have hitherto been synthesized in various methods, but recently a method has been developed wherein the base, one member of reactant materials, has been replaced partially with an organic base. This method is described on pages 304–312 of "Zeolite Molecular Sieves" by D. W. Breck (Wiley Inter Science published 1974). As the representative synthetic example thereof is well known a method wherein the reactant material, namely, the base, is exchanged partially by a primary amine or quaternary ammonium salt.

When synthesis is carried out according to the above mentioned method, there can be obtained crystalline aluminosilicate zeolites having a high $SiO_2/Al_2O_3$ mole ratio. Such crystalline aluminosilicate zeolites are known to exhibit enhanced thermal stability and acid resistance and to function as high active catalysts in catalytic cracking of hydrocarbons, alkylation isomerization and the like.

The inventors of this invention has carried out a series of studies to find that crystalline aluminosilicate zeolites having a high $SiO_2/Al_2O_3$ mole ratio can be synthesized by utilizing an alkali metal and an amide compound as the base constituting the reactant material.

SUMMARY OF THE INVENTION

This invention provides a method of preparing a crystalline aluminosilicate zeolite that comprises preparing a mixture containing an alkali metal compound, an amide compound, a silicon compound, an aluminum compound and water and having a composition, in terms of mole ratios, falling within the following ranges:

$SiO_2/Al_2O_3$: 5 to 1000
$H_2O/SiO_2$: 5 to 300
$M/SiO_2$: 0.001 to 10
$A/SiO_2$: 0.01 to 10 wherein M is an alkali metal oxide and A is an amide compound, holding this mixture at elevated temperature and pressure until aluminosilicate zeolite crystals are formed, and then separating said crystals and recovering them.

The crystalline aluminosilicate zeolite synthesized according to this invention has a high $SiO_2/Al_2O_3$ mole ratio and can be used as the catalyst for hydrocarbon conversion reactions such as catalytic cracking, alkylation, isomerization and the like. In addition, the crystalline aluminosilicate zeolite of this invention has a molecular sieving ability peculiar generally to crystalline zeolites. In this connection, it is to be noted that surprisingly the crystalline aluminosilicate zeolite of this invention is characterized in that it, even when taking such a very fine crystal form as cannot be discerned by a normal X-ray powder diffraction method, can exhibit the function as molecular sieve, for instance, to adsorb para-xylene selectively from a mixture of xylene isomers.

Generally speaking, the crystallinity of a crystalline material can be discerned by a normal X-ray powder diffraction method. However, it is known that if the material is surely a crystalline material but its crystal is very small, X-ray diffraction is unable to discern whether it is crystalline or not. Every crystalline aluminosilicate zeolite synthesized according to this invention exhibits the molecular seiving ability inherent generally in crystalline zeolites, which includes such a crystalline aluminosilicate zeolite that X-ray diffraction cannot discern whether it is crystalline or not.

DESCRIPTION OF THE PREFERRED EMBODIMENTS

In synthesizing the crystalline aluminosilicate zeolite of this invention, a source of silica may be used in the conventional forms such as silica sol, silica gel, water glass and the like. Further, a source of alumina may be used in the conventional forms such as alumina gel, alumina sol, sodium aluminate, a salt of aluminum and the like. Still further, as a source of base, the alkali metal is used in the form of either salts or hydroxides but is preferred to be soluble in water. The organic base used profitably in this invention is a water soluble amide compound.

The amide compounds usable in this invention can generally be represented by the formula:

RCONHR' wherein R is H, $C_nH_{2n+1}$ (n=1–7), $C_nH_{2n}OH$ (n=1–2), $C_6H_4OH$, $C_6H_5$, $C_6H_4NO_2$, $C_6H_4CO_2H$, $C_5H_4N$, $CH_3CH(OH)$ or the like; and R' is H, Cl, $CH_3$, $C_2H_5$, $C_2H_4OH$ or the like.

The typical amide compounds include formamide, acetamide, acetamide benzoate, acetochloroamide, propionamide, butylamide, benzamide, nicotinamide, lactamide, N-β-hydroxyethyl lactamide, caproic amide, glycolic amide and the like. It is to be understood that the aforesaid various amide compounds are enumerated only by way of example and this invention should not be limited thereto.

In this invention, a reaction mixture having the following composition, in terms of mole ratios, is first prepared using the above mentioned reactant material:

$SiO_2/Al_2O_3$: 5 to 1000

H₂O/SiO₂: 5 to 300
M/SiO₂: 0.001 to 10
A/SiO₂: 0.01 to 10 (wherein, M is an alkali metal oxide and A is an amide compound).

In the method of this invention, at least one member of the chloride, bromide and sulfate of at least one metal selected from the group consisting of sodium, potassium and barium may be used as a mineralizer. These mineralizers may be either added to the reaction mixture or formed in the reaction mixture.

The reaction mixture is maintained under the conditions including temperature, time and pressure sufficient to form a crystalline aluminosilicate zeolite. The reaction temperature is in the range of 80° C. to 300° C., preferably 120° C. to 175° C., and the reaction time is in the range of 3 hours to 60 days, preferably 1 day to 5 days. The reaction may be carried out at ordinary pressure, but is is more preferable to carry out the reaction under pressure, sufficiently at autogenous pressure. Preferably, the mixture should be kept stirring during the reaction period.

The thus obtained crystalline product is filtered out, washed with water and separated from the reaction mediums. Further, the crystals may be dried and calcined if necessary. For instance, drying may be effected at 110° C. within the range of 3 hours to 24 hours, and calcining in the range of 200° C. to 1000° C., preferably 400° C. to 800° C.

At least part of the alkali metal cations within the crystalline aluminosilicate zeolite synthesized according to this invention can be ion-exchanged in accordance with techniques well-known in the art, preferably after calcining, with other cations, for instance, cations or their mixtures selected from the group consisting of hydrogen, precursors of hydrogen and metals of Groups I to VIII of the Periodic Table.

The method according to this invention will be detailed hereinafter with reference to examples.

EXAMPLE 1

72.58 grams water glass of the third grade (which includes 28.6 wt.% SiO₂, 9.3 wt.% Na₂O and 62.1 wt.% H₂O) was dissolved in 63 grams water. The resulting solution was named A. 1.41 grams sulfuric acid and 5.28 grams aluminum sulfate, Al₂(SO₄)₃·18H₂O were dissolved in 26 grams water. The resulting solution was named B. 14.5 grams aqueous solution of N-β-hydroxyethyl lactamide, C₅H₁₁O₃N which contains 30 wt.% H₂O was named C.

The solution A was first placed in a 500 ml-autoclave made of stainless steel coated with tetrafluoroethylene, then the solution C was added thereto with stirring, and lastly the solution B was added thereto with stirring. This reaction mixture has a composition, in terms of mole ratios, as follows:

8.9Na₂O:9.6C₅H₁₁O₃N:Al₂O₃:44.6SiO₂:984H₂O:4.8Na₂SO₄

This reaction mixture was held at 150° C. for 4 days at autogenous pressure with stirring at about 300 rpm. The thus obtained crystalline product was filtered, washed in water and dried at 110° C. for 16 hours.

X-ray powder diffraction analysis of the dried sample showed the product to be crystalline. Further, this product was calcined at 540° C. for 24 hours. Analysis of this calcined product showed a high SiO₂/Al₂O₃ mole ratio as represented in terms of mole ratios, as follows:

0.38Na₂O:Al₂O₃:29.7SiO₂

EXAMPLES 2 TO 4

The same procedure as Example 1 was repeated using the reaction mixture having the same composition as the reaction mixture prepared according to Example 1 except that the reaction mixture was held for 10 hours (Example 2), for 2 days (Example 3) and for 3 days (Example 4) respectively. X-ray powder diffraction analysis of the thus obtained products showed those except for the product obtained in Example 2 to be crystalline.

EXAMPLE 5

The solution A obtained in Example 1 was also employed here as the solution A. 3.15 grams sulfuric acid and 1.31 grams aluminum sulfate were dissolved in 13 grams water. The resulting solution was named B. 6.8 grams aqueous solution of the N-β-hydroxyethyl lactamide used in Example 1 was named C.

The same procedure as Example 1 was repeated to thereby prepare a reaction product. This reaction mixture has a composition, in terms of mole ratios, as follows:

36.0Na₂O:18.2C₅H₁₁O₃N:Al₂O₃:175.8SiO₂:3514H₂O:19.3Na₂SO₄

The same operation as Example 1 was repeated except that this reaction mixture was held for 10 days. X-ray powder diffraction analysis showed the thus obtained product to be crystalline.

EXAMPLE 6

79.96 grams silica sol (which contains 30.4 wt.% SiO₂, 0.4 wt.% Na₂O and 69.2 wt.% H₂O) was named A. The solution of 1.53 grams sodium aluminate, NaAlO₂, (which contains 51.3 wt.% Al₂O₃ and 41.7 wt.% Na₂O) in 30.56 grams water was named B. 20.0 grams aqueous solution of the N-β-hydroxyethyl lactamide used in Example 1 was named C.

The same procedure as Example 1 was repeated to prepare a reaction mixture. This reaction mixture was observed to have a composition, in terms of mole ratios, as follows:

2.0Na₂O:13.7C₅H₁₁O₃N:Al₂O₃:52.6SiO₂:664H₂O

The same operation as Example 1 was repeated except that this reaction mixture was held for 10 days. X-ray diffraction analysis showed the thus obtained product to be crystalline.

EXAMPLE 7

The solution A obtained in Example 1 was also employed here as the solution A. 1.41 grams sulfuric acid and 5.28 grams of the aluminum sulfate were dissolved in 20 grams water. The resulting solution was named B. The solution obtained by dissolving 4.50 grams acetamide, C₂H₅ON, in 4.50 grams water was named C.

A reaction mixture was prepared by repeating the same procedure as Example 1. This reaction product was observed to have a composition, in terms of mole ratios, as follows:

8.9Na$_2$O:9.5C$_2$H$_5$OH:Al$_2$O$_3$:43.6SiO$_2$:987H$_2$O:4.8Na$_2$SO$_4$

The same operation as Example 1 was repeated except that thi reaction mixture was held for 7 days. X-ray powder diffraction analysis showed the thus obtained product to be crystalline.

EXAMPLE 8

72.58 grams of the water glass used in Example 1 was dissolved in 33 grams water. The resulting solution was named A. 1.4 grams sulfuric acid and 5.28 grams of the aluminum sulfate were dissolved in 15.6 grams water. The resulting solution was named B. 10.4 grams orthoaminobenzamide, C$_7$H$_8$ON$_2$, was dissolved in 40.5 grams water. The resulting solution was named C.

A reaction mixture was prepared by repeating the same procedure as Example 1. This reaction mixture was observed to have a composition, in terms of mole ratios, as follows:

8.9Na$_2$O:9.6C$_7$H$_8$ON$_2$:Al$_2$O$_3$:43.6SiO$_2$:958H$_2$O:4.8Na$_2$SO$_4$

The same operation as Example 1 was repeated except that this reaction mixture was held for 7 days. X-ray powder diffraction analysis showed the thus obtained product to be crystalline.

EXAMPLE 9

Solutions A and B are the same as defined in Example 8. 9.51 grams nicotinamide, C$_6$H$_6$N$_2$O, was dissolved in 40.5 grams water. The resulting solution was named C.

A reaction mixture was prepared by repeating the same procedure as Example 1. This reaction mixture was observed to have a composition, in terms of mole ratios, as follows:

8.9Na$_2$O:9.6C$_6$H$_6$N$_2$O:Al$_2$O$_3$:43.6SiO$_2$:958H$_2$O:4.8Na$_2$SO$_4$

The same operation as Example 1 was repeated except that this reaction mixture was held for 7 days. X-ray powder diffraction analysis showed the thus obtained product to be crystalline.

COMPARATIVE EXAMPLE 1

38.17 grams of the silica sol used in Example 6 was dissolved in 100 grams water. The resulting solution was named A. 30.89 grams n-tetrapropylammoniumbromide, [(CH$_3$CH$_2$CH$_2$)$_4$N]Br, 1.6 grams of the sodium aluminate used in Example 6 and 1.3 grams sodium hydroxide were dissolved in 100 grams water. The resulting solution was named B.

The solution A was first placed in a 500 ml-autoclave made of stainless steel coated with tetrafluoroethylene and then the solution B was added thereto with stirring. This reaction mixture was observed to have a composition, in terms of mole ratios, as follows:

3.5Na$_2$O:8.5[(CH$_3$CH$_2$CH$_2$)$_4$N]$_2$O:Al$_2$O$_3$:27.9SiO$_2$:1848H$_2$O

This reaction mixture was subjected to the same operation as Example 1. X-ray powder diffraction analysis showed the thus obtained product to be crystalline. The obtained product was calcined at 540° C. for 24 hours. Analysis showed that this product had a composition, in terms of mole ratios, as follows:

0.55Na$_2$O:Al$_2$O$_3$:21.3SiO$_2$

COMPARATIVE EXAMPLE 2

48.39 grams of the water glass used in Example 1 was dissolved in 60 grams water. The resulting solution was made A. 4.03 grams of sulfuric acid and 1.66 grams of the aluminum sulfate were dissolved in 83 grams water. The resulting solution was named B. 2.70 grams of n-propylamine (C$_3$H$_9$N) was named C.

A reaction mixture was prepared by repeating the same procedure as Example 1. This reaction mixture was observed to have a composition, in terms of mole ratios, as follows:

8.3Na$_2$O:9.2C$_3$H$_9$N:Al$_2$O$_3$:93.5SiO$_2$:3877H$_2$O:19.5Na$_2$SO$_4$

This reaction mixture was subjected to the same operation as Example 1 except that said mixture was held at 178° C. X-ray powder diffraction analysis showed the thus obtained product to be crystalline. The obtained product was calcined at 540° C. for 24 hours. Analysis showed the thus calcined product to have a composition, in terms of mole ratios, as follows:

0.06Na$_2$O:Al$_2$O$_3$:482SiO$_2$

COMPARATIVE EXAMPLE 3

72.58 grams of the water glass used in Example 1 was dissolved in 91 grams water. The resulting solution was named A. 6.05 grams sulfuric acid and 2.48 grams of the aluminum sulfate were dissolved in 124 grams water. The resulting solution was named B. 8.7 grams n-octylamine (C$_8$H$_{19}$N) was named C.

A reaction mixture was prepared by repeating the same procedure as Example 1. This reaction mixture was observed to have a composition, in terms of mole ratios, as follows:

9.7Na$_2$O:18.1C$_8$H$_{19}$N:Al$_2$O$_3$:92.9SiO$_2$3915H$_2$O:19.6Na$_2$SO$_4$

This reaction mixture was subjected to the same operation as Example 1. X-ray powder diffraction analysis showed the thus obtained product to be crystalline. The obtained product was calcined at 540° C. for 24 hours. Analysis showed the thus calcined product to have a composition, in terms of mole ratios, as follows:

0.45Na$_2$O:Al$_2$O$_3$:52.4SiO$_2$

COMPARATIVE EXAMPLE 4

The solution A used herein is the same as defined in Comparative Example 3. 2.0 grams sulfuric acid and 0.82 gram of the aluminum sulfate were dissolved in 41.1 grams water. The resulting solution was named B. 2.5 grams n-laurylamine (C$_{12}$H$_{27}$N) was named C.

A reaction mixture was prepared by repeating the same procedure as Example 1. This reaction mixture was observed to have a composition, in terms of mole ratios, as follows:

68.7Na$_2$O:10.9C$_{12}$H$_{27}$N:Al$_2$O$_3$:280SiO$_2$:8003H$_2$O:19.1 Na$_2$SO$_4$

This reaction mixture was subjected to the same operation as Example 1. X-ray powder diffraction analysis showed the thus obtained product to be crystalline. The obtained product was calcined at 540° C. for 24 hours. Analysis showed the thus calcined product to have a composition, in terms of mole ratios, as follows:

$1.4Na_2O:Al_2O_3:39.8SiO_2$

COMPARATIVE EXAMPLE 5

The solution A used herein is the same as defined in Comparative Example 3. 3.0 grams sulfuric acid and 1.24 grams of the aluminum sulfate were dissolved in 124 grams water. The resulting solution was named B. 1.4 grams n-tetradecylamine ($C_{14}H_{31}N$) was named C.

A reaction mixture was prepared by repeating the same procedure as Example 1. This reaction mixture was observed to have a composition, in terms of mole ratios, as follows:

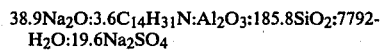

$38.9Na_2O:3.6C_{14}H_{31}N:Al_2O_3:185.8SiO_2:7792-H_2O:19.6Na_2SO_4$

This reaction mixture was subjected to the same operation as Example 1. X-ray powder diffraction analysis showed the thus obtained product to be crystalline. The obtained product was calcined at 540° C. for 24 hours. Analysis showed to have a composition, in terms of mole ratios, as follows:

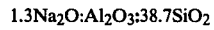

$1.3Na_2O:Al_2O_3:38.7SiO_2$

COMPARATIVE EXAMPLE 6

The product obtained by synthesis according to Comparative Example 1 was calcined at 540° C. for 24 hours, and thereafter ion exchanges were conducted 3 times at 100° C. using a 5 normal ammonium chloride solution in an amount of 15 ml per gram of the calcined product. The exchanged product was water washed completely until free of chlorine, and then dried at 110° C. for 16 hours.

COMPARATIVE EXAMPLE 7

The same procedure as Comparative Example 6 was repeated except that the product obtained by synthesis according to Comparative Example 2 was employed.

COMPARATIVE EXAMPLE 8

The same procedure as Comparative Example 6 was repeated except that the product obtained by synthesis according to Comparative Example 3 was employed.

COMPARATIVE EXAMPLE 9

The same procedure as Comparative Example 6 was repeated except that the product obtained by synthesis according to Comparative Example 4 was employed.

COMPARATIVE EXAMPLE 10

The same procedure as Comparative Example 6 was repeated except that the product obtained by synthesis according to Comparative Example 5 was employed.

EXPERIMENTAL EXAMPLE

Zeolites synthesized or ion exchanged according to Examples 1 to 2 and Comparative Examples 1 to 7 were calcined at 540° C. for 1 day under an aerial atmosphere. The calcined zeolites were contacted with mixtures of xylene isomers under undermentioned conditions, and thereafter subjected to liquid phase analysis:

| (1) Liquid composition | Ethylbenzene | 24.6 wt. % |
| | p-Xylene | 25.5 wt. % |
| | m-Xylene | 24.7 wt. % |
| | o-Xylene | 25.2 wt. % |
| (2) Liquid/Solid ratio | 2.5 (wt/wt) | |
| (3) Temperature | 25° C. | |
| (4) Time | 1 hour | |

The results of analysis are as shown in the following Table 1.

TABLE 1

| Experiment No. | Sample | Equilibrium liquid composition (wt. %) | | | |
|---|---|---|---|---|---|
| | | Ethylbenzene | p-Xylene | m-Xylene | o-Xylene |
| 1 | Zeolite synthesized according to Example 1 | 24.9 | 22.0 | 26.7 | 26.4 |
| 2 | Zeolite synthesized according to Example 2 | 24.7 | 23.5 | 26.0 | 25.8 |
| 3 | Zeolite synthesized according to Comparative Example 1 | 24.6 | 25.5 | 24.7 | 25.2 |
| 4 | Zeolite synthesized according to Comparative Example 2 | 24.6 | 25.5 | 24.7 | 25.2 |
| 5 | Zeolite synthesized according to Comparative Example 3 | 24.6 | 25.5 | 24.7 | 25.2 |
| 6 | Zeolite synthesized according to Comparative Example 4 | 24.6 | 25.5 | 24.7 | 25.2 |
| 7 | Zeolite synthesized according to Comparative Example 5 | 24.6 | 25.5 | 24.7 | 25.2 |
| 8 | Zeolite synthesized according to Comparative Example 6 | 25.0 | 24.0 | 25.0 | 26.0 |
| 9 | Zeolite sybtgesized according to Comparative Example 7 | 24.9 | 23.2 | 25.6 | 26.3 |

It can be seen from Table 1 that the crystalline aluminosilicate zeolites synthesized according to the present invention, as synthesized, are capable of selectively adsorbing p-xylene from the mixture of xylene isomers, while the crystalline aluminosilicate zeolites synthesized using the primary amine or quarternary ammonium salt as the organic base, as synthesized, do not exhibit any ability to selectively adsorb p-xylene and do not display selective adsorbability against p-xylene till it is transformed into the proton type.

In addition thereto, it is clearly seen from Experiment No. 2 that the crystalline aluminosilicate zeolites synthesized according to the present invention, even when their crystals are too fine to be discerned by a normal X-ray powder diffraction method, have the property of adsorbing p-xylene selectively from the mixture of xylene isomers.

We claim:

1. A process for the preparation of a crystalline aluminosilicate zeolite, which comprises:
   preparing a mixture of an alkali metal compound, an amide compound, a silicon compound, an aluminum compound and water, said mixture having a composition, in terms of mole ratios, falling within the following ranges:

$SiO_2/Al_2O_3$: 5 to 1000
$H_2O/SiO_2$: 5 to 300
$M/SiO_2$: 0.001 to 10
$A/SiO_2$: 0.01 to 10 wherein M is an alkali metal oxide and A is said amide compound; holding said mixture at a temperature in the range of 80° C. to 300° C. and at elevated pressure for a period in the range of 3 hours to 60 days until aluminosilicate zeolite crystals are formed; and then recovering said crystals.

2. A process as claimed in claim 1, wherein said temperature is in the range of 120° C. to 175° C., said holding period is in the range of 1–5 days, and said elevated pressure is autogenous pressure.

3. A process as claimed in claim 1, wherein said amide compound is selected from the group consisting of formamide, acetamide, acetamide benzoate, acetochloroamide, propionamide, butylamide, benzamide, nicotinamide, lactamide, N-β-hydroxyethyl lactamide, caproic amide and glycolic amide.

4. A process as claimed in claim 1, wherein said crystals are recovered by successively filtering said crystals from said mixture, washing said crystals with water, and drying said crystals.

5. A process as claimed in claim 4, further comprising calcining said dried crystals at a temperature in the range of 200° C. to 1000° C.

6. A process as claimed in claim 1, wherein said mixture further contains a mineralizer selected from the group consisting of the chloride, bromide and sulfate of at least one metal selected from sodium, potassium and barium.

7. A process as claimed in claim 1, wherein said alkali metal oxide is $Na_2O$, and said silicon compound is $SiO_2$.

8. A process for the preparation of a crystalline aluminosilicate zeolite which comprises:
preparing a reaction mixture consisting essentially of $SiO_2$, $Na_2O$, $Al_2O_3$, an amide compound selected from the group consisting of formamide, acetamide, acetamide benzoate, acetochloroamide, propionamide, butylamide, benzamide, nicotinamide, lactamide, N-β-hydroxyethyl lactamide, caproic amide and glycolic amide, and the balance is essentially water, said mixture having a composition such that the mole ratios of the foregoing ingredients of said mixture fall within the ranges:
$SiO_2/Al_2O_3$: 5 to 1000
$H_2O/SiO_2$: 5 to 300
$Na_2O/SiO_2$: 0.001 to 10
$A/SiO_2$: 0.01 to 10
wherein A is said amide compound;
stirring said reaction mixture, while maintaining said mixture at a temperature in the range of 80° C. to 300° C., at autogenous pressure, for a period in the range of 3 hours to 60 days, thereby forming aluminosilicate zeolite crystals; and
then recovering said crystals, which crystals consist essentially of $Na_2O$, $Al_2O_3$ and $SiO_2$.

* * * * *